(12) United States Patent
Rubenacker

(10) Patent No.: US 6,282,857 B1
(45) Date of Patent: Sep. 4, 2001

(54) ARTICULATING PLATE ASSEMBLY FOR RETAINING SHEETS OF ROOFING MATERIAL ON A ROOF SURFACE

(75) Inventor: James C. Rubenacker, Lakeville, MA (US)

(73) Assignee: Sarnafil, Inc., Canton, MA (US)

( * ) Notice: Subject to any disclaimer, the term of this patent is extended or adjusted under 35 U.S.C. 154(b) by 0 days.

(21) Appl. No.: 09/521,986

(22) Filed: Mar. 9, 2000

(51) Int. Cl.[7] .............................. E04B 7/00; F16B 43/00; F16B 43/02
(52) U.S. Cl. .............................. 52/410; 52/512; 411/531; 411/537
(58) Field of Search ...................... 52/410, 412; 411/531, 411/537, 545

(56) References Cited

U.S. PATENT DOCUMENTS

| | | |
|---|---|---|
| 1,024,127 * | 4/1912 | Gadd ................................. 411/531 X |
| 3,415,064 * | 12/1968 | Talobre ............................. 411/531 X |
| 4,380,413 | 4/1983 | Dewey . |
| 4,726,164 * | 2/1988 | Reinwall et al. ...................... 52/410 |
| 4,787,188 | 11/1988 | Murphy . |
| 4,799,845 * | 1/1989 | Hrysko ................. 52/410 X |
| 4,860,513 | 8/1989 | Whitman . |
| 4,945,699 | 8/1990 | Murphy . |
| 5,557,897 * | 9/1996 | Kranz et al. ............................. 52/41 |
| 5,797,232 | 8/1998 | Larsen . |
| 5,803,693 | 9/1998 | Choiniere et al. . |

FOREIGN PATENT DOCUMENTS

1193489 * 11/1959 (FR) .................................... 411/537

* cited by examiner

*Primary Examiner*—Laura A. Callo
(74) *Attorney, Agent, or Firm*—Pandiscio & Pandiscio

(57) ABSTRACT

An articulating plate assembly for retaining sheets of roofing material on a roof surface includes a plate defining (i) a generally hemispherically-shaped recess in a central portion of a first surface thereof, and (ii) an aperture disposed in the recess and extending through the plate, and a fastener having (i) a shank portion configured to pass through the aperture and to engage the roof surface, and (ii) a head portion having an underside of a curved configuration generally complementary to the recess.

31 Claims, 4 Drawing Sheets

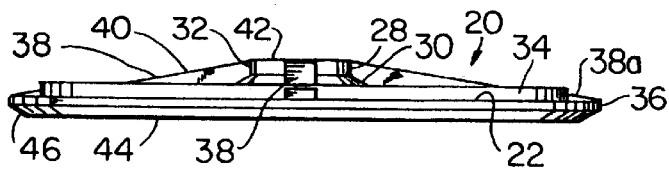
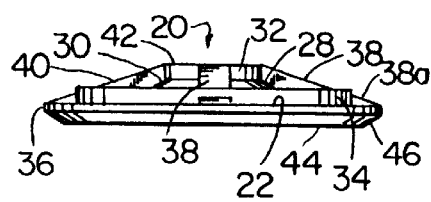
FIG. 3    FIG. 4
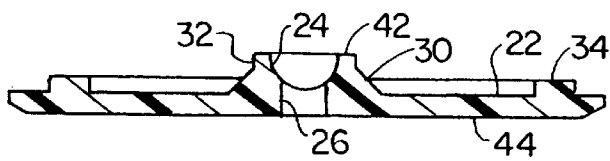
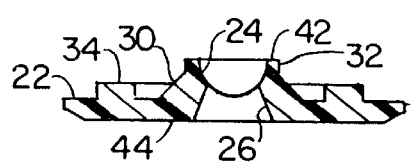
FIG. 9    FIG. 7
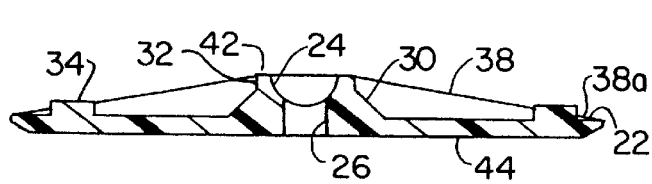
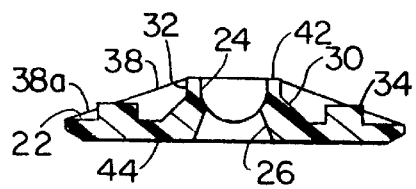
FIG. 8    FIG. 6

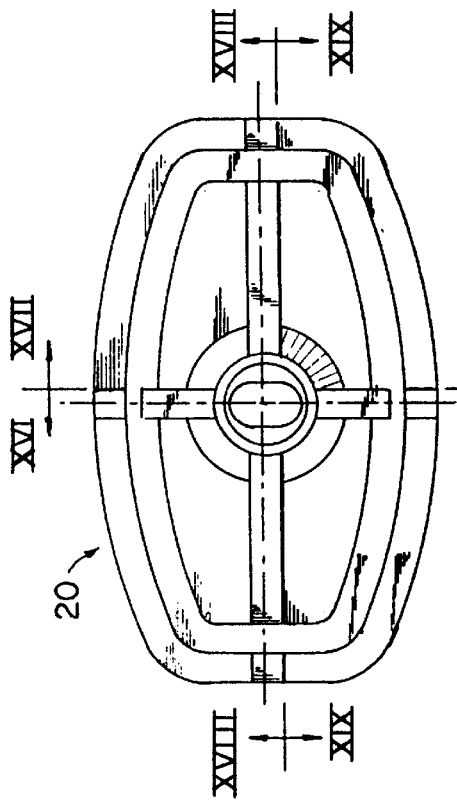
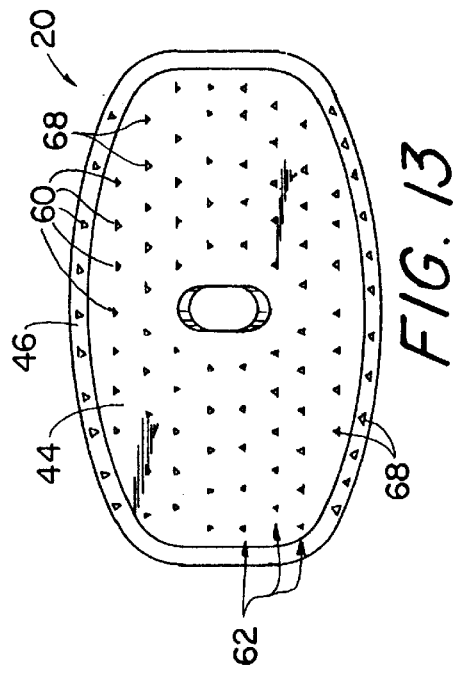
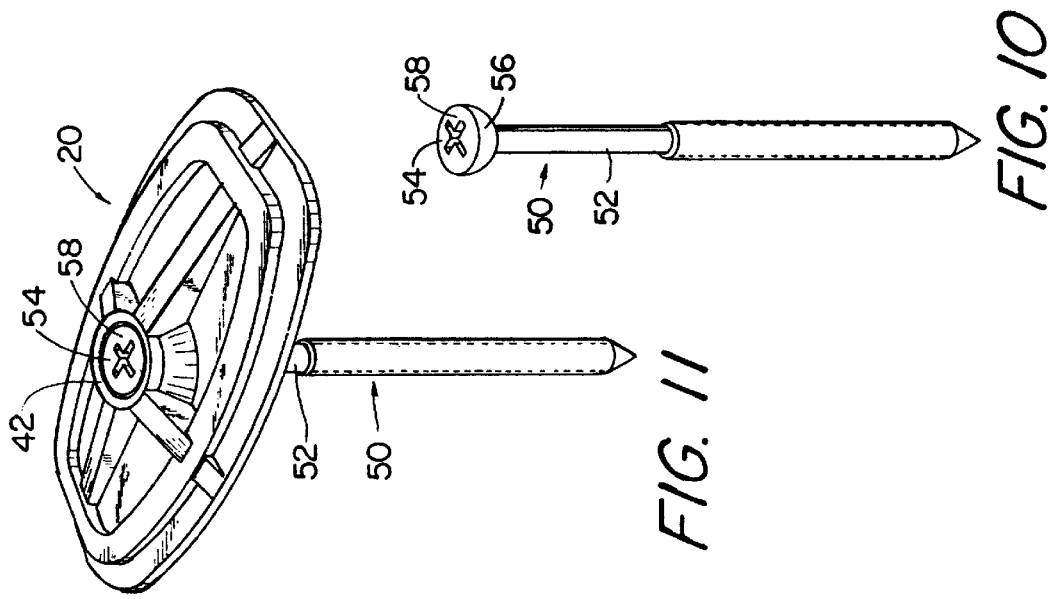

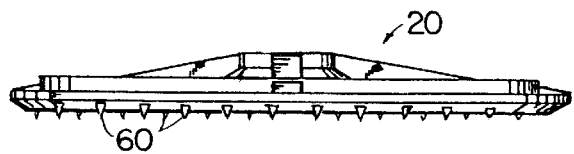
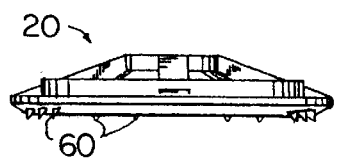
FIG. 14  FIG. 15
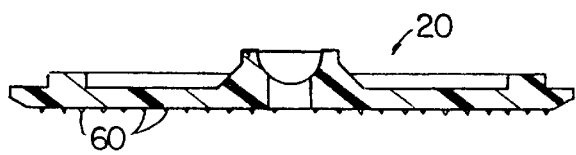
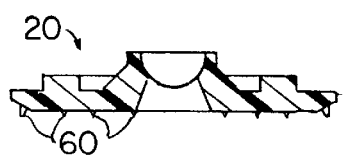
FIG. 19  FIG. 17
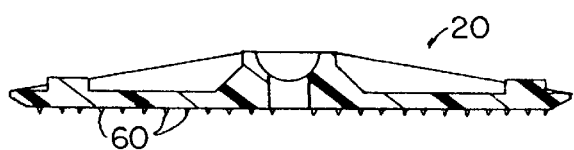
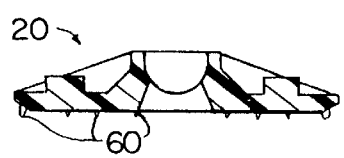
FIG. 18  FIG. 16
 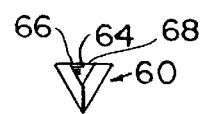 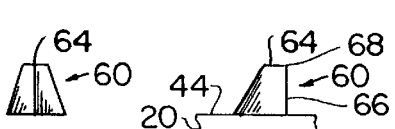
FIG. 20  FIG. 21  FIG. 22  FIG. 23
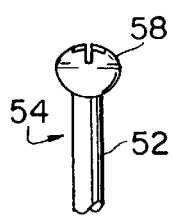
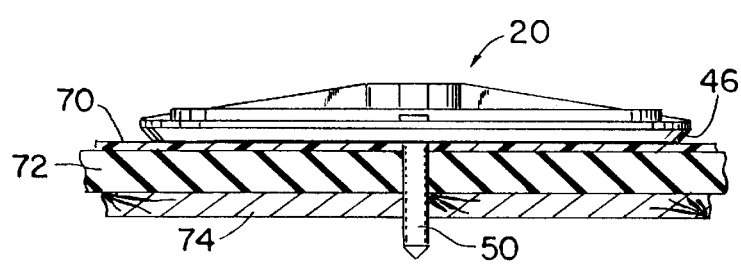
FIG. 24  FIG. 25

ARTICULATING PLATE ASSEMBLY FOR RETAINING SHEETS OF ROOFING MATERIAL ON A ROOF SURFACE

BACKGROUND OF THE INVENTION

1. Field of the Invention

This invention relates to fastener assemblies and is directed more particularly to a fastener assembly for retaining sheets of roofing material on a roof.

2. Description of the Prior Art

Stress plates for securing a sheet of roofing material, often referred to as a "membrane", to a roof deck, or other structural member or roof surface, are generally known. Such plates usually are secured to the roof deck, structural member or surface by fasteners which pass through openings in the plates, through the membrane, and engage the deck or structural member. Plates of this type are shown, for example, in U.S. Pat. No. 4,787,188, issued Nov. 29, 1988 to Colin R. Murphy and U.S. Pat. No. 4,945,699, issued Aug. 7, 1990 to Colin R. Murphy.

The stress plates commonly are used to clamp membranes to the roof deck. In practice, the membrane is applied to the roof deck at a seam portion defined by an overlapping disposition of membranes. A lower membrane is fastened to the roof deck by use of the stress plates and fasteners, typically screws. An upper membrane is lapped over the lower membrane in such a manner as to overlie the stress plates, with the upper membrane being secured to the lower membrane by a welded seam.

The stress plate is mounted on the lower membrane with an undersurface of the stress plate in clamping engagement with the lower membrane. It has generally been thought that loosening of a stress plate, as by loosening of a retaining screw, permits the membrane to slide out from under the stress plate. It has been believed that tight compression of the membrane by the plate is the way to retain the membrane in place in the event of high winds, and the like.

It has been found, however, that high winds simply rip the membrane from around the plate. Thus, while the plate may remain solidly attached to the roof deck, the membrane is nevertheless loosened or lost.

Accordingly, there is a need for stress plate assemblies capable of holding a membrane in place in high winds and resisting membranes tearing away from the plates.

SUMMARY OF THE INVENTION

An object of the invention is, therefore, to provide a stress plate assembly capable of retaining a roof membrane in high winds.

With the above and other objects in view, as will hereinafter appear, a feature of the present invention is the provision of an articulating plate assembly for retaining sheets of roofing material on a roof surface, the assembly comprising a plate defining (i) a generally hemispherically-shaped recess in a central portion of a first surface thereof, and (ii) an aperture disposed in the recess and extending through the plate, and a fastener having (i) a shank portion configured to pass through the aperture and to engage the roof surface, and (ii) a head portion having an underside of a curved configuration generally complementary to the recess.

The above and other features of the invention, including various novel details of construction and combinations of parts, will now be more particularly described with reference to the accompanying drawings and pointed out in the claims. It will be understood that the particular assembly embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings:

FIG. 3 is a side elevational view thereof;

FIG. 4 is an end elevational view thereof;

FIG. 6 is a sectional view taken along line VI—VI of FIG. 2;

FIG. 7 is a sectional view taken along line VII—VII of FIG. 2;

FIG. 8 is a sectional view taken along line VIII—VIII of FIG. 2;

FIG. 9 is a sectional view taken along line IX—IX of FIG. 2;

FIG. 10 is a perspective view of a fastener portion of the assembly;

FIG. 11 is a perspective view of the assembly;

FIGS. 12, 13, 14 and 15 are similar to FIGS. 2, 5, 3, and 4, respectively, but are illustrative of an alternative embodiment;

FIG. 16 is a sectional view taken along line XVI—XVI of FIG. 12;

FIG. 17 is a sectional view taken along line XVII—XVII of FIG. 12;

FIG. 18 is a sectional view taken along line XVIII—XVIII of FIG. 12;

FIG. 19 is a sectional view taken along line XIX—XIX of FIG. 12;

FIGS. 20–23 are, respectively, perspective, end, front and side views of a portion of the alternative embodiment;

FIG. 24 is a side elevational view of a portion of the fastener, illustrative of an alternative embodiment; and FIG. 25 is a diagrammatic view, partly in section and partly in side elevation of the assembly of FIG. 11 in operative position on a roof structure.

DESCRIPTION OF THE PREFERRED EMBODIMENTS

Figure 2:
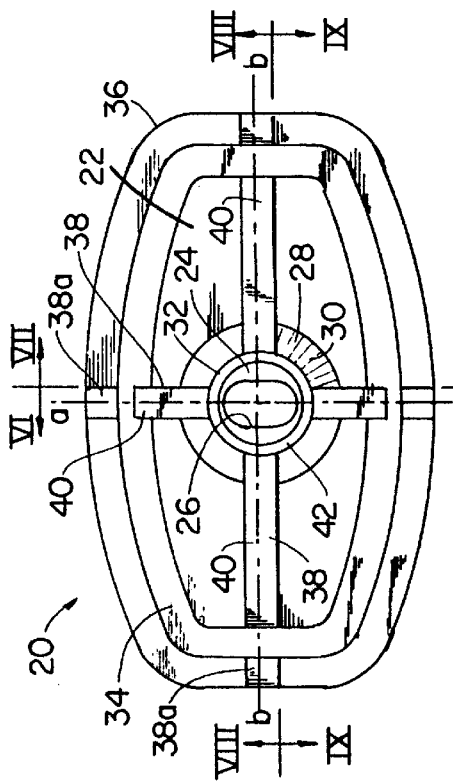
FIG. 2 is a top plan view of the plate of FIG. 1.
Figure 5:
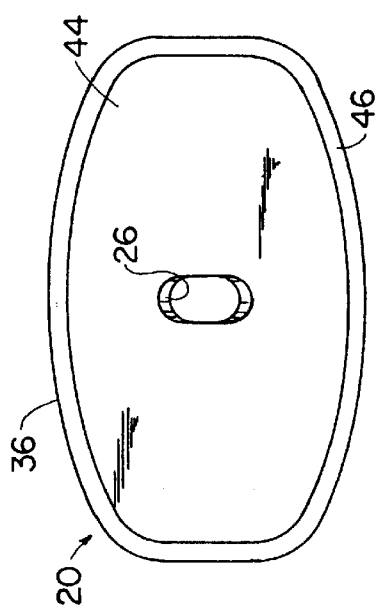
FIG. 5 is a bottom view thereof.

Referring to FIGS. 1–8, it will be seen that the illustrative assembly includes a stress plate 20 for retaining sheets of roofing materials, or membranes, on a roof deck or other structural member. The plate 20 is provided with an upper surface 22 with a generally hemispherically-shaped recess 24 disposed in a central portion of the plate. The plate 20 is further provided with an aperture 26 disposed in the recess 24 and extending through the plate 20.

The plate 20 is of an elongated configuration, and the aperture 26 is of an elongated configuration, with a lengthwise axis a—a (FIG. 2) of the aperture 26 extending transversely of a lengthwise axis b—b of the plate 20, and preferably normal thereto. The plate 20 is of a rigid plastics material, such as nylon or lucite, or the like, and preferably is molded.

As shown in FIGS. 1–4, the plate 20 is provided with an upstanding crown 28 on the upper surface 22 thereof. The crown 28 comprises a frusto-conically shaped base portion 30 (see also FIGS. 6–9) extending from the upper surface 22, and a cylindrically-shaped collar portion 32 extending from the base portion 30.

The plate 20 is further provided with a network of reinforcing ribs on the upper surface 22 thereof. In the embodiment shown in FIGS. 1–4 and 6–9, there is provided a rib network including a rib 34 on the upper surface 22. The rib 34 may be spaced inwardly of, but adjacent to, a perimeter 36 of the plate 20. Additional ribs, or struts 38, may be disposed on the upper surface 22 of the plate 20 and may extend from the crown 28 to the rib 34, and preferably, beyond the rib 34, as indicated at 38a.

Figure 1:
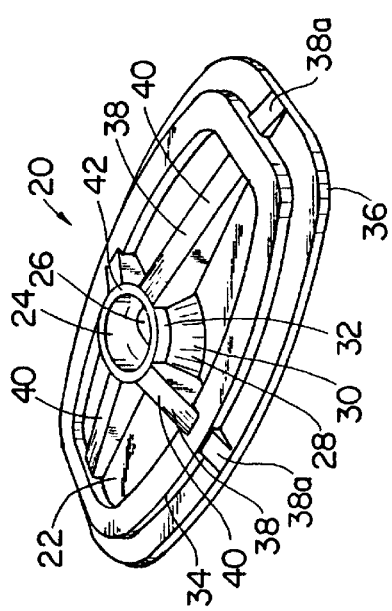
FIG. 1 is a perspective view of an articulating plate portion of an assembly illustrative of an embodiment of the invention.

As may be seen in FIGS. 1, 3 and 4, the crown 28 is provided with a greater height than the rib 34 and a free edge 40 of each of the struts 38 may angle from a planar top surface 42 of the crown 28 downwardly and toward the rib 34.

Referring to FIGS. 3–9, it will be seen that the plate 20 is provided with a generally planar bottom surface 44 having a peripheral portion 46 sloping toward the upper surface 22.

Referring to FIGS. 10 and 11, it will be seen that the assembly further includes a fastener 50, such as a screw, compression fastener, rivet, or the like, having a shank portion 52 configured to pass through the aperture 26 and engage the roof deck. In FIGS. 10 and 11, there is shown fastener 50 in the form of a screw for threadedly engaging the roof deck. The fastener 50 is further provided with a head portion 54 having an underside 56 of a curved configuration generally complementary to the recess 24. The fastener head portion 54 is provided with a top surface 58 which may be planar, as illustrated in FIGS. 10 and 11, or of rounded configuration (FIG. 24). Preferably, the fastener head portion top surface 58 is rounded sufficiently to be devoid of sharp corners which might engage an overlying membrane. The head portion 56 is configured to be slightly recessed in the crown 28 when the fastener is in operative position.

In use, the stress plate assembly disclosed hereinabove is applied in substantially the same manner as the prior art plates discussed previously. Referring to FIG. 25, it will be seen that the plate 20 is placed on a roof membrane 70 overlying an insulative elastomeric sheet 72 which, in turn, overlies a roof deck 74, or other structural component. The fastener 50 holds the layered combination of components together. However, upon lifting of the roof membrane 70, as by heavy winds, the plate 20 is pivotally moveable about the fastener head portion 54, particularly the underside 56 thereof. The elastomeric sheet 72 is sufficiently flexible and resilient to permit the pivotal movement of the plate 20. High winds which would normally rip the retained roof membrane 70 off the plate 20, raise the membrane into engagement with the plate peripheral portions 46, to cause the plate to lift in a pivoting manner to accommodate movement of the membrane. The plate 20 is able to tilt on the fastener 50, the surface of the plate recess 24 riding on the underside 56 of the screw head, and the plate aperture 26 moving relative to the screw shank portion 52. It has been found that by introducing an enhanced degree of flexibility in what in the prior art is a relatively rigid clamping situation, the plate is able to "give" sufficiently to save ripping away of the membrane.

Referring to FIGS. 12–16, it will be seen that in an alternative embodiment the bottom surface 44 of the stress plate 20 is provided with a plurality of protrusions 60 extending therefrom. The protrusions 60 may be in the form of dimples or spikes, or the like, and assist in providing a grip between the plate 20 and the membrane.

In a preferred embodiment, shown in FIG. 13, the protrusions 60 are arranged in rows 62, which are staggered. The peripheral portion 46 preferably is provided with the protrusions 60 along the lengthwise portions thereof. Aside from the provision of the protrusions 60, the embodiment of stress plate 20 shown in FIGS. 12–16, is substantially identical to the stress plate shown in FIGS. 1–11, and operates in substantially the same manner. The fastener 50 shown in FIGS. 10 and 11 is suitably engaged with either embodiment of stress plate.

In FIGS. 20–23, there is shown the configuration of a preferred embodiment of protrusion 60, preferably molded integrally with the plate 20. The protrusions are provided with a generally frusto-pyramidal configuration with a planar outer surface 64 which engages the membrane, but does not cut through the membrane. In the event a protrusion pierces the membrane, the protrusions are of a height of not more than about 0.04 inch, so as not to extend completely through the membrane.

Each of the protrusions 60 is provided with a planar side 66 which faces outwardly toward lengthwise side edges of the bottom surface 44 of the plate 20, as shown in FIG. 13, and extends substantially normal to the bottom surface 44, as shown in FIG. 23. Thus, in operation, the edge 68 formed by the confluence of planar side 66 and outer end surface 64, increases engagement with the membrane 70 when the membrane is urged upwardly by high winds, or the like.

There is thus provided an articulating stress plate assembly capable of holding a membrane in place on a roof deck in high winds and resisting membranes tearing away from the stress plate.

It is to be understood that the present invention is by no means limited to the particular construction herein disclosed and/or shown in the drawings, but also comprises any modifications or equivalents within the scope of the appended claims.

What is claimed is:

1. An articulating plate assembly for retaining sheets of roofing material on a roof surface, said assembly comprising:
   a plate defining (i) a generally hemispherically-shaped recess in a central portion of a first surface thereof, and (ii) an aperture disposed in said recess and extending through said plate, wherein said plate is provided with an upstanding crown on the first surface thereof and said recess is disposed centrally of said crown; and
   a fastener having (i) a shank portion configured to pass through said aperture and to engage the roof surface, and (ii) a head portion having an underside of a curved configuration generally complementary to said recess.

2. The plate assembly in accordance with claim 1 wherein a second surface of said plate is provided with a plurality of protrusions extending therefrom.

3. The plate assembly in accordance with claim 1 wherein said crown comprises (i) a frusto-conically shaped base portion extending from said first surface, and (ii) a cylindrically-shaped collar portion extending from said base portion.

4. The plate assembly in accordance with claim 1 wherein said plate is provided with reinforcing ribs upstanding from the first surface thereof.

5. An articulating plate assembly for retaining sheets of roofing material on a roof surface, said assembly comprising:
   a plate defining (i) a generally hemispherically-shaped recess in a central portion of a first surface thereof, and (ii) an aperture disposed in said recess and extending through said plate, wherein said plate is provided with a generally planar second surface, a peripheral portion of said second surface sloping toward said first surface; and
   a fastener having (i) a shank portion configured to pass through said aperture and to engage the roof surface, and (ii) a head portion having an underside of a curved configuration generally complementary to said recess.

6. The plate assembly in accordance with claim 5 wherein said plate second surface is provided with a plurality of protrusions and said peripheral portion is provided at least in part with a portion of said protrusions.

7. An articulating plate assembly for retaining sheets of roofing material on a roof surface, said assembly comprising:
   a plate defining (i) a generally hemispherically-shaped recess in a central portion of a first surface thereof, and (ii) an aperture disposed in said recess and extending through said plate; and
   a fastener having (i) a shank portion configured to pass through said aperture and to engage the roof surface, and (ii) a head portion having an underside of a curved configuration generally complementary to said recess;
   wherein said plate is of an elongated configuration, said aperture is elongated, and a lengthwise axis of said aperture extends transversely of a lengthwise axis of said plate.

8. The plate assembly in accordance with claim 7 wherein the lengthwise axis of said aperture is substantially normal to the lengthwise axis of said plate.

9. The plate assembly in accordance with claim 7 wherein a second surface of said plate is provided with a plurality of protrusions extending therefrom.

10. The plate assembly in accordance with claim 9 wherein said protrusions comprise at least one of dimples and spikes having a height of no more than about 0.04 inch.

11. The plate assembly in accordance with claim 10 wherein said plurality of protrusions comprises a plurality of rows of protrusions.

12. The plate assembly in accordance with claim 11 wherein said rows of protrusions are staggered.

13. The plate assembly in accordance with claim 9 wherein said protrusions are each provided with a planar outer end for engaging the roofing material.

14. The plate assembly in accordance with claim 9 wherein said plate second surface is provided with a peripheral portion sloping toward said first surface, and at least portions of said peripheral portion are provided with a portion of said protrusions.

15. The plate assembly in accordance with claim 9 wherein a plurality of said protrusions each comprises a planar side surface substantially normal to the plate second surface, a planar end surface substantially parallel to the plate second surface, and an edge formed by a confluence of said side surface and said end surface, said side surface and said edge facing outwardly of said plate and toward a lengthwise side edge of said plate.

16. The plate assembly in accordance with claim 8 wherein said plate is of molded plastics material.

17. The plate assembly in accordance with claim 7 wherein a top surface of said fastener head portion is rounded.

18. The plate assembly in accordance with claim 7 wherein said plate is provided with an upstanding crown on the first surface thereof and said recess is disposed centrally of said crown.

19. The plate assembly in accordance with claim 18 wherein said plate is provided with a network of ribs upstanding on the first surface thereof.

20. The plate assembly in accordance with claim 18 wherein said crown comprises (i) a frusto-conically shaped base portion extending from said first surface, and (ii) a cylindrically-shaped collar portion extending from said base portion.

21. The plate assembly in accordance with claim 7 wherein said plate is provided with a generally planar second surface, a peripheral portion of said second surface sloping toward said first surface.

22. The plate assembly in accordance with claim 7 wherein said fastener comprises a screw and said shank portion is adapted to threadedly engage the roof surface.

23. A roof structure comprising:
   a deck of rigid material;
   a sheet of elastomeric material disposed over said deck;
   a sheet of roof membrane material disposed over said sheet of elastomeric material; and
   a plate assembly disposed on said roof membrane material for retaining said sheet of roof membrane material, said plate assembly comprising:
      a plate defining (i) a generally hemispherically-shaped recess in a central portion of a first surface thereof, and (ii) an aperture in said recess and extending through said plate, wherein said plate is provided with an upstanding crown on the first surface thereof and said recess is disposed centrally of said crown, and
      a fastener having (i) a shank portion extending through said aperture and engaging said deck, and (ii) a head portion disposed in said recess and having an underside of a curved configuration generally complementary to said recess;
   wherein upon lifting of said roof membrane sheet, said plate is pivotally movable about said fastener head portion, and said sheet of elastomeric material permits the movement of said plate.

24. The roof structure in accordance with claim 23 and further comprising protrusions extending from a second surface of said plate and in engagement with said sheet of roof membrane material.

25. A roof structure comprising:
   a deck of rigid material;
   a sheet of elastomeric material disposed over said deck;
   a sheet of roof membrane material disposed over said sheet of elastomeric material; and
   a plate assembly disposed on said roof membrane material for retaining said sheet of roof membrane material, said plate assembly comprising:
      a plate defining (i) a generally hemispherically-shaped recess in a central portion of a first surface thereof, and (ii) an aperture in said recess and extending through said plate, wherein said plate is provided with a generally planar second surface, a peripheral portion of said second surface sloping toward said first surface; and
      a fastener having (i) a shank portion extending through said aperture and engaging said deck, and (ii) a head portion disposed in said recess and having an underside of a curved configuration generally complementary to said recess;

wherein upon lifting of said roof membrane sheet, said plate is pivotally movable about said fastener head portion, and said sheet of elastomeric material permits the movement of said plate.

26. The roof structure in accordance with claim 25 and further comprising protrusions extending from a second surface of said plate and in engagement with said sheet of roof membrane material.

27. A roof structure comprising:

a deck of rigid material;

a sheet of elastomeric material disposed over said deck;

a sheet of roof membrane material disposed over said sheet of elastomeric material; and a plate assembly disposed on said roof membrane material for retaining said sheet of roof membrane material, said plate assembly comprising:

plate defining (i) a generally hemispherically-shaped recess in a central portion of a first surface thereof, and (ii) an aperture in said recess and extending through said plate, wherein said plate is of an elongated configuration, said aperture is elongated, and a lengthwise axis of said aperture extends transversely of a lengthwise axis of said plate; and a fastener having (i) a shank portion extending through said aperture and engaging said deck, and (ii) a head portion disposed in said recess and having an underside of a curved configuration generally complementary to said recess;

wherein upon lifting of said roof membrane sheet, said plate is pivotally movable about said fastener head portion, and said sheet of elastomeric material permits the movement of said plate.

28. The roof structure in accordance with claim 27 and further comprising protrusions extending from a second surface of said plate and in engagement with said sheet of roof membrane material.

29. An articulating plate assembly for retaining sheets of roofing material on a roof surface, said assembly comprising:

a plate defining (i) at least one generally hemispherically-shaped recess in a central portion of a first surface thereof, and (ii) an aperture disposed in each said recess and extending through said plate, wherein said plate is provided with at least one upstanding crown on the first surface thereof and each said recess is disposed centrally of each said crown; and at least one fastener each having (i) a shank portion configured to pass through said aperture of each said recess and to engage the roof surface, and (ii) a head portion having an underside of a curved configuration generally complementary to each said recess.

30. An articulating plate assembly for retaining sheets of roofing material on a roof surface, said assembly comprising:

a plate defining at least one (i) a generally hemispherically-shaped recess in a central portion of a first surface thereof, and (ii) an aperture disposed in each said recess and extending through said plate, wherein said plate is provided with a generally planar second surface, an edge portion of said second surface sloping toward said first surface; and at least one fastener each having (i) a shank portion configured to pass through said aperture of each said recess and to engage the roof surface, and (ii) a head portion having an underside of a curved configuration generally complementary to each said recess.

31. An articulating plate assembly for retaining sheets of roofing material on a roof surface, said assembly comprising:

a plate defining (i) at least one generally hemispherically-shaped recess in a central portion of a first surface thereof, and (ii) an aperture disposed in each said recess and extending through said plate; and at least one fastener each having (i) a shank portion configured to pass through said aperture of each said recess and to engage the roof surface, and (ii) a head portion having an underside of a curved configuration generally complementary to each said recess;

wherein said plate is of an elongated configuration, said aperture is elongated, and a lengthwise axis of said aperture extends transversely of a lengthwise axis of said plate.

* * * * *

UNITED STATES PATENT AND TRADEMARK OFFICE
CERTIFICATE OF CORRECTION

PATENT NO. : 6,282,857 B1
DATED : September 4, 2001
INVENTOR(S) : James C. Rubenacker Page 1 of 1

It is certified that error appears in the above-identified patent and that said Letters Patent is hereby corrected as shown below:

<u>Column 8, claim 8,</u>
Change line 13 to read as follows:
-- a plate defining (i) at least one generally --.

Signed and Sealed this

Sixteenth Day of April, 2002

Attest:

JAMES E. ROGAN
*Director of the United States Patent and Trademark Office*

*Attesting Officer*